Nov. 9, 1948.　　　H. A. ALEXANDERSON　　　2,453,653
REGULATOR

Filed Aug. 24, 1944　　　　　　　　　　　　　4 Sheets-Sheet 2

INVENTOR.
*Howard A. Alexanderson*
BY
*Herbert L. Davis, Jr.*
ATTORNEY

Nov. 9, 1948.　　　H. A. ALEXANDERSON　　　2,453,653
REGULATOR
Filed Aug. 24, 1944　　　　　　　　　　　　4 Sheets-Sheet 4

INVENTOR.
Howard A. Alexanderson
BY
Herbert L. Davis, Jr.
ATTORNEY

Patented Nov. 9, 1948

2,453,653

UNITED STATES PATENT OFFICE 2,453,653

REGULATOR

Howard A. Alexanderson, Wood-Ridge, N. J., assignor to Bendix Aviation Corporation, Teterboro, N. J., a corporation of Delaware Application August 24, 1944, Serial No. 551,036

8 Claims. (Cl. 123—103)

The present invention relates to regulators and more particularly to novel means for controlling the air inlet pressure of a supercharged aircraft engine so as to maintain the pressure thereof at either of two preselected absolute pressures.

During the operation of so-called "water" or "anti-knock" fluid injection systems for suppressing predetonation in internal combustion engines, an increase in the air inlet pressure of the induction system for the engine is permissible and desirable in order that greater engine power may be obtained than when such injection system is not in operation. Therefore, an object of the present invention is to provide a regulator responsive to operation of such an injection system for effecting a predetermined increase in the air pressure in the induction system.

Another object of the invention is to provide a regulator having novel means for shifting the setting thereof in response to an operating condition.

Another object of the invention is to provide a novel regulator arranged to maintain the air inlet of a supercharged aircraft engine at a first preselected pressure value, when such supplemental fluid injection system is not in operation and said regulator further arranged to maintain such pressure at a second relatively higher reset pressure when such injection system is in operation.

Another object of the invention is to provide first novel means for adjusting the setting of the minimum value at which the regulator will shift from one pressure setting to the other pressure setting.

Another object of the invention is to provide second novel means for adjusting the setting of the maximum reset pressure of the regulator.

Another object of the invention is to provide a novel assemblage whereby the first and second adjustment means may be conveniently mounted one coaxial with the other.

A further object of the invention is to provide a novel regulator for a supercharger.

These and other objects and features of the invention are pointed out in the following description in terms of the embodiment thereof which is shown in the accompanying drawings. It is to be understood, however, that the drawings are for the purpose of illustration only, and are not designed as a definition of the limits of the invention, reference being had to the appended claims for this purpose.

In interpreting the appended claims, where they refer to a supercharger, they are to be construed as including application of the invention to any known type supercharger, however driven, and to any type of throttle controlled engine, and, where the claims are directed to less than all of the elements disclosed, they are intended to cover possible uses of the recited elements in installations which lack the non-recited elements.

In the drawings, wherein reference numerals refer to like parts throughout the several views.

Figure 1:
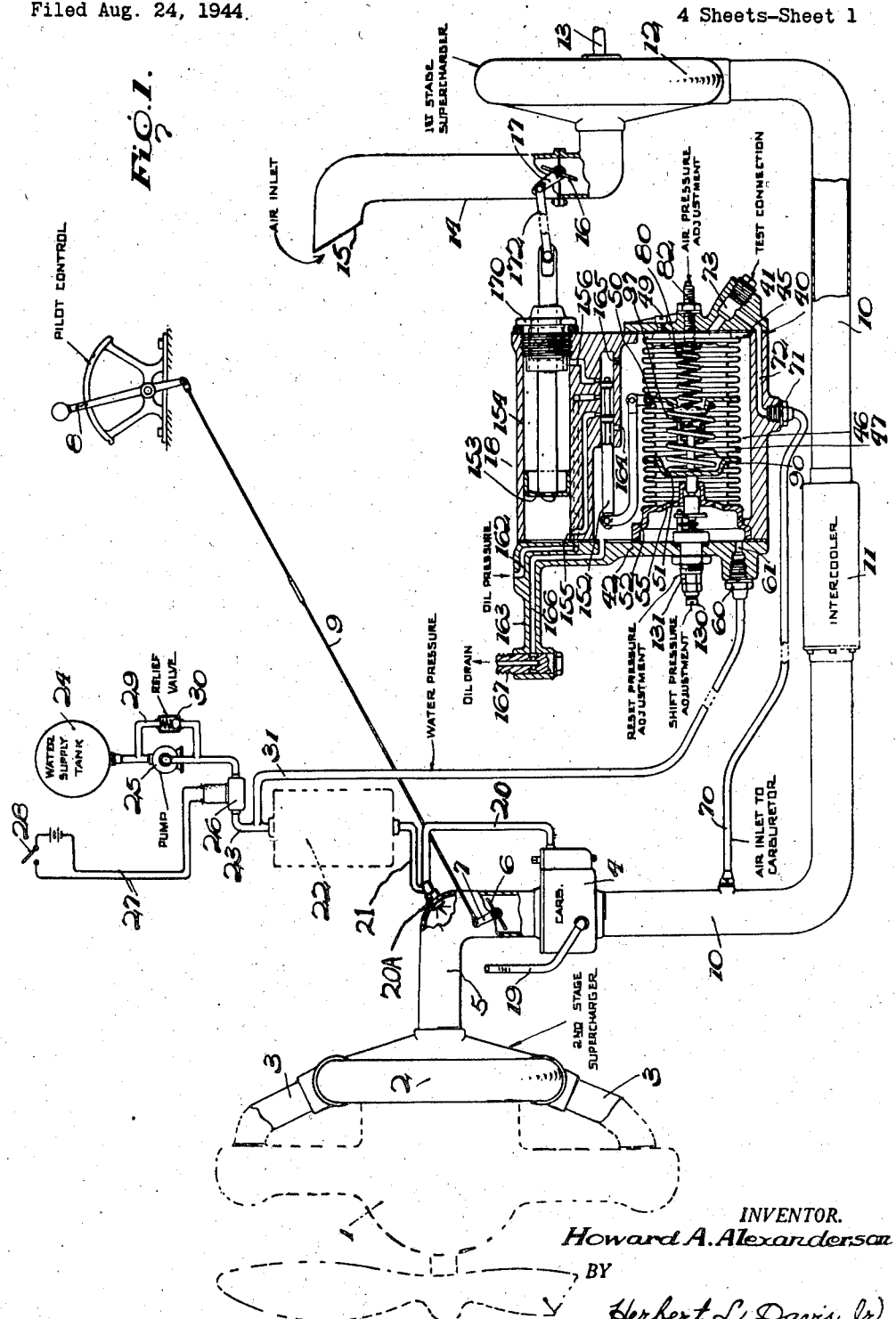
Figure 1 is a schematic view illustrating the manner in which the regulator may be connected in operating relation in the induction and supplemental fluid injection system for an aircraft engine.

Referring first to Figure 1, there is shown in dotted outline a typical radial aircraft engine 1 drivingly connected in a conventional manner to a supercharger 2. The supercharger 2 has provided conduits 3 discharging into the cylinder intakes of the engine 1. The engine 1 is also provided with a carburetor indicated generally by numeral 4 operably connected by means of conduit 5 to the inlet of the supercharger 2. A conventional butterfly valve 6 is provided in the conduit 5. The valve 6 has the usual operating lever 7 positioned by a pilot's control lever 8 through connecting rod 9. A conduit 10 connects through an intercooler 11 the air inlet of the carburetor 4 to the outlet of a primary stage supercharger 12. The supercharger 12 may be drivingly connected through a shaft 13 to the aircraft engine 1 or to any other suitable driving means. A conduit 14 connects the inlet of the supercharger 12 to the atmosphere through a suitable air inlet member 15.

A conventional butterfly valve 16 having an operating lever 17 is provided in the air inlet 14 for the supercharger 12. The lever 17 is operatively controlled by a regulator 18, as will be hereinafter explained.

As best shown schematically in Figure 1, there is connected to the carburetor 4 a conduit 19 leading from a suitable source of fluid fuel for the aircraft engine. There is also provided a conduit 20 for injecting the fuel into the induction system through a nozzle 20A. There is further provided a conduit 21 for injecting into the induction system through nozzle 20A a supplemental or so-called "anti-knock" fluid medium such as water, water-alcohol or other suitable fluid well known in the art for suppressing predetonation of the engine 1.

The conduit 21 is connected to a suitable metering device shown in dotted outline and indicated generally by the numeral 22. The latter metering device may be of any suitable type known in the art for determining the rate of flow of the "supplemental" fluid, and, since the herein invention resides in the regulator means rather than in the metering device, the same has been shown diagrammatically by the outline indicated by numeral 22.

A conduit 23 leads to the metering device 22 from a suitable source of "supplemental" fluid indicated by numeral 24. In the conduit 23, there is provided a pump indicated by numeral 25 driven by a suitable power means not shown. The pump 25 supplies the fluid medium under pressure to the metering device 22. A valve 26 is provided in the conduit 23 between the pump and metering device 22 for "off" and "on" control of the "supplemental" fluid injection system. The control valve 26 may be of any suitable type, but is shown herein as of an electromagnet controlled type having an electrical control circuit 27 and switch 28 which is preferably mounted within the aircraft cabin for convenient operation by the pilot. Thus the supplemental fluid injection system may be placed in operation by the pilot closing the switch 28 so as to effect the opening of the valve 26. Conversely, the valve 26 may be closed by opening the switch 28. A by-pass conduit 29 and relief valve 30 is provided for recirculating the fluid medium from the pump outlet to the pump inlet at such times as the valve 26 is closed and the injection system is not in operation.

A conduit 31 is connected to the conduit 23 between the valve 26 and the metering device 22. The conduit 31 leads to the regulator 18 so that, during operation of the injection system, the regulator 18 is subject to the pressure of the supplemental fluid medium under force of the pump 25, as will be explained hereinafter. It will be readily seen, however, that, when the injection system is in operation, the fluid medium will exert through the conduit 31 a greater pressure under force of the pump 25 than when the injection system is not in operation.

Figure 2:
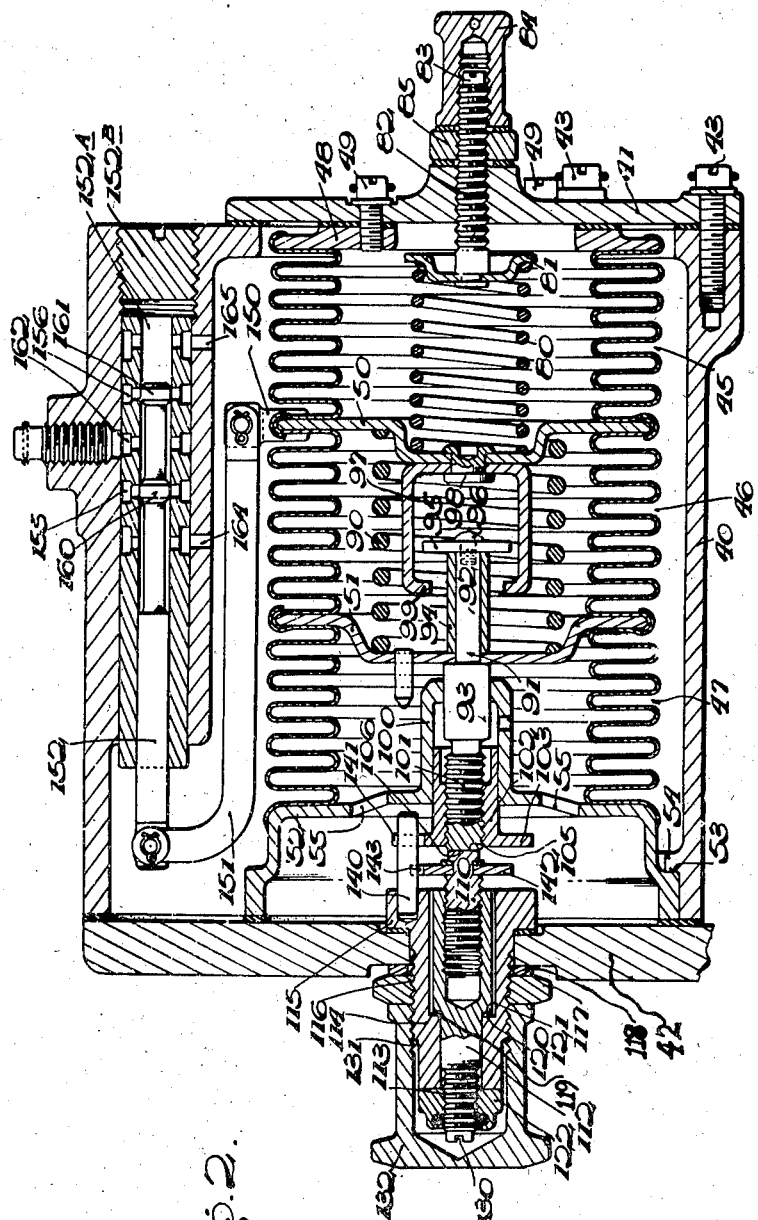
Figure 2 is a sectional view taken along the lines 2—2 of Figure 3 and looking in the direction of the arrows.
Figure 3:
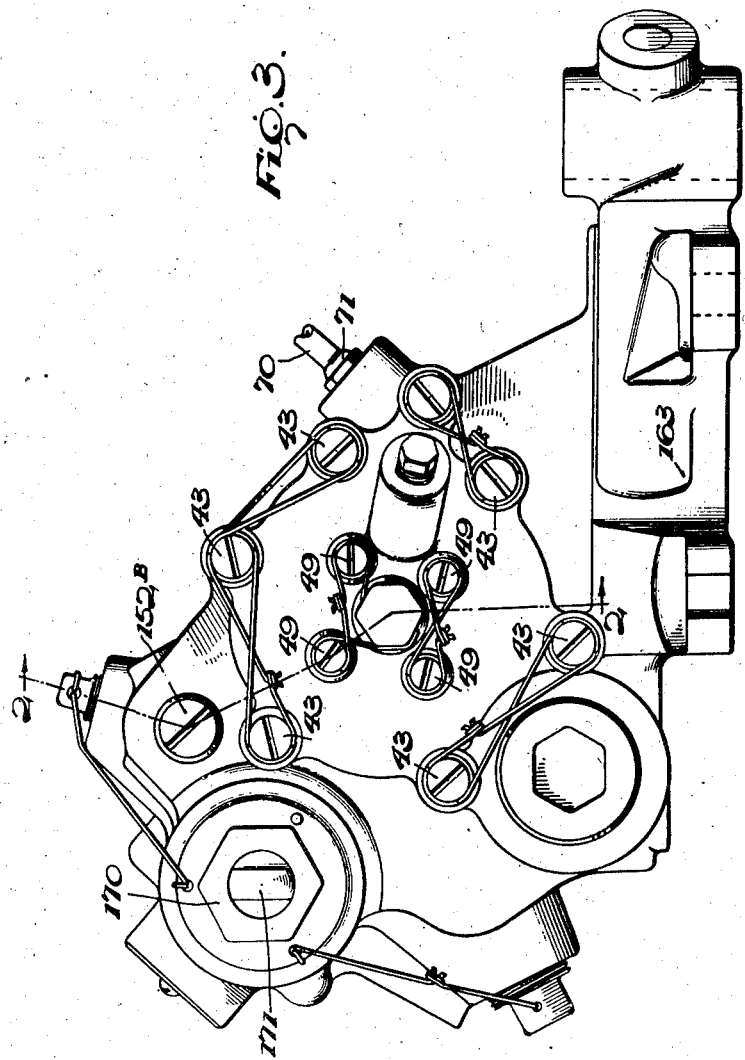
Figure 3 is a plan view of one end of the regulator.
Figure 4:
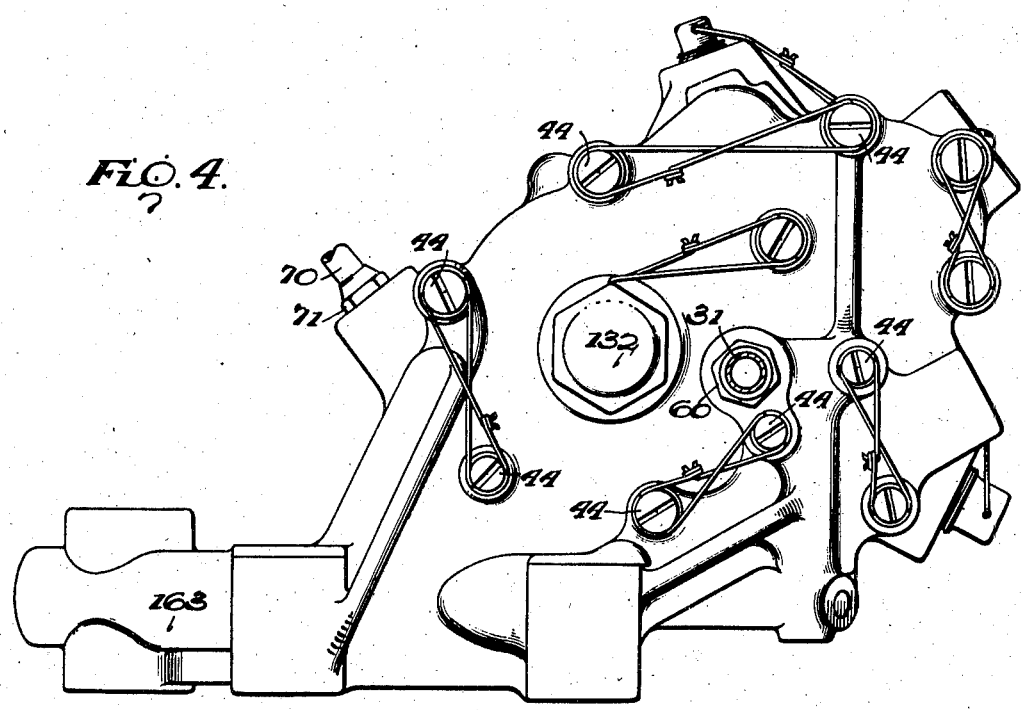
Figure 4 is a plan view of the opposite end of the regulator from that shown in Figure 3.
Figure 5:
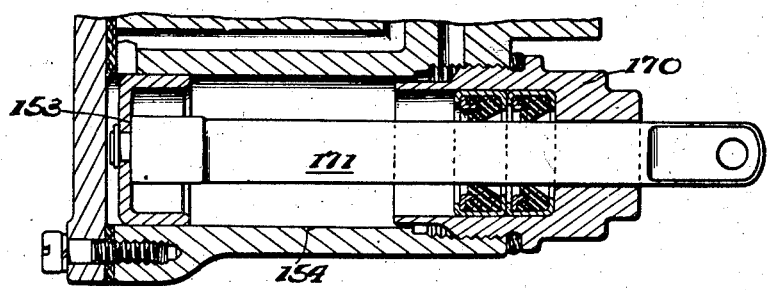
Figure 5 is a somewhat enlarged fragmentary sectional view of the piston.

The regulator 18, as best shown in Figures 1 and 2, includes a casing or housing 40 having end plates 41 and 42 fastened at opposite ends of the casing 40 by bolts 43 and 44, respectively, as shown in Figures 3 and 4.

Positioned within the casing 40 and between the end plates 41 and 42 are three flexible walled cylinders or bellows 45, 46 and 47. The bellows 45 is fastened at one end to a plate 48 connected to the end plate 41 by bolts 49. The opposite end of the bellows 45 is fastened about the adjacent ends of bellows 46 and a sealing plate 50 interposed between the opposite ends of the bellows 45 and 46.

A second sealing plate 51 is positioned at the other end of the bellows 46 and has the adjacent ends of bellows 46 and 47 secured about the periphery thereof.

The opposite ends of bellows 47 are secured to the sides of a rigid cup-shaped member 52 having a flanged portion 53 which engages a raised portion 54 projecting from the inner surface of the casing 40. The open end of the cup-shaped member 52 is closed in sealing relation by the end plate 42. Ports 55 open from the interior of the member 52 into the interior of the bellows 47.

The conduit 31, as best shown in Figure 1, connected at one end to the supplemental fluid supply conduit 23, is connected at the opposite end to a nipple 60 mounted in the end plate 42 and opening into a passage 61 leading into the interior of the cup-shaped member 52.

A second conduit 70 leads from the carburetor air inlet conduit 10 to a nipple 71 mounted in the side of casing 40. The nipple 71 opens into a passage 72 formed in the wall of the casing 40 which in turn leads into a passage 73 formed in end plate 41, and opening into the interior of bellows 45, as shown schematically in Figure 1.

A helical spring 80 is positioned within the bellows 45 and has one end biased against the plate 50, while the opposite end of the spring 80 is held by an adjustable plate 81 affixed to a longitudinally adjustable screw 82. The screw 82 is screw threadedly engaged in the end plate 41 and has an end cleft portion 83 projecting exteriorly from the plate 41 for convenient adjustment. The end portion 83 of the screw 82 may be conveniently protected from accidental adjustment by a suitable cap member 84 screw threadedly engaged on the screw 82, as shown in Figure 2. A lock nut 85 is provided for securing the screw 82 in adjusted position. It will be readily seen that, by adjusting the screw 82 in the end plate 41, the relative position of the plate 81 may be adjusted longitudinally so as to vary the tension exerted by the spring 80.

The bellows 46 is evacuated and has provided therein a second spring 90 interposed between the end plates 50 and 51 and tending to bias the plate 50 so as to oppose the biasing force exerted on the plate 50 by the spring 80.

The plate 51 has provided a novel support including a stem member 91 affixed to the plate 51 and having portions 92 and 93 projecting at opposite sides thereof into the bellows 46 and 47 respectively.

The portion 93 engages one side of the plate 51, while a tubular member 94 surrounds the portion 92 and is drawn into engaging relation with the other side of the plate 51 by a disk 95 fastened at the free end of the portion 92 by a rivet 96. The disk 95 is arranged to move freely within a strap 97 fastened at one end by a rivet member 98 to the plate 50. The strap 97 has a flanged portion 99 provided at the other end arranged to engage the disk 95 at the extreme limit of movement of the plate 50 under the biasing force of the spring 90. Similarly, the screw 96 will engage the rivet member 98 to limit the movement of the plate 50 in the opposite direction under the biasing force of the spring 80 augmented by the biasing force of the pressure medium introduced into the bellows 45 through the conduit 70. Thus, the expansion and contraction of the bellows 45 and 46 may be limited within a safe range, so as to prevent under extreme pressure conditions the overtravel of a control valve 152 operably connected thereto.

The portion 93 of the stem 92 slides within a collar 100 projecting into the bellows 47 from the cup-shaped member 52. A screw threaded end 101 projects from the portion 93 and has screw threadedly engaged thereon a nut portion 102 having a flange 103 mounted at one end thereof. The opposite end of the nut portion 102 is suitable recessed so as to receive part of the portion 93 upon longitudinal adjustment of the nut 102 in relation thereto. The flange 103 of the nut 102 is arranged to engage the inner surface of the member 52 so as to limit the movement of the plate 51 upon expansion of the bellows 47 under the biasing force of a pressure medium therein, as will be explained.

Movement of the plate 51 in an opposite direction as upon contracting of the bellows 47 is limited by the free end 105 of the portion 101 contacting an adjacent end 106 of an adjustable stem 110.

The adjustable stem 110 is screw threadedly engaged in a sleeve portion 111 of a stem 112 having a screw threaded end portion 113. The stem 112 and sleeve portion 111 are rotatably mounted in a sleeve 114 which projects through the end plate 42. The sleeve 114 has provided at the inner end thereof a flange portion 115 which engages the inner surface of the end plate 42. Suitable screw threads 116 are provided on the outer surface of the sleeve 114 for engagement by a suitable nut 117 which fastens the sleeve 114 in the end plate 42 at the outer side thereof. A suitable sealing member 118 is positioned between the end plate 42 and the flange 115 for preventing leakage of a fluid medium.

Provided within the sleeve 114 is a shoulder 120 arranged to cooperate with shoulder 121 provided on stem 112 to prevent outward longitudinal movement of the stem 112 in relation the sleeve 114. A suitable sealing member 119 is positioned between the shoulders 120 and 121. A nut 122 is positioned at the outer end of the stem 112 in screw threaded engagement with the portion 113 and in contacting relation with the outer end of the sleeve 114 so as to prevent inward longitudinal movement of the stem 112 in relation to the sleeve 114. A cleft portion 130 is provided at the end of the stem 112 while a hexagonal shaped portion 131 is provided on the sleeve 114, as best shown in Figures 1 and 2, for facilitating rotary adjustment of the stem 112 and sleeve 114, as will be explained. A cover cap 132 is provided to prevent accidental adjustment of the sleeve 114 and stem 112 and may be screw threadedly mounted on the threads 116.

A pin 140 is fixedly mounted in the flange 115 at the inner end of the sleeve 114 and extends longitudinally into a suitable slot 141 formed in the flange 103 of the nut 102 so that the nut 102 may be rotatably connected to the sleeve 114. Further, a plate 142 is fixedly mounted at the free end of the adjustable stem 110. The plate 142 has provided a suitable notch 143 in which is engaged the pin 140 so as to prevent relative rotary movement between the stem 110 and sleeve 114.

From the foregoing, it will be readily seen that, by rotating the stem 112 relative to the sleeve 114 through means of a screw driver or other suitable tool operably engaged in the cleft 130, the stem 110 screw threadedly engage in the sleeve 111 will move longitudinally since the same will be secured against rotary movement by the pin 140 carried by the sleeve 114 which may be held against rotary movement in any convenient manner. Thus, the position of the end 106 of the stem 110 may be adjusted in relation to the end 105 of the stem 101 and accordingly the return or initial position of the plate 51, as shown in Figure 2, varied.

Moreover, upon imparting a rotary movement to the sleeve 114 in relation to the end plate 42 through means of a wrench or other suitable means operably engaging the hexagonal portion 131, it will be seen that a corresponding rotary movement will be imparted through the pin 140 to the nut 102 through the flange 103 and connecting slot 141. Such rotary movement will cause the nut 102 to move longitudinally on the screw threaded portion 101 of the stem 93, since the stem 93 is fixedly mounted on the plate 51 against a rotary movement relative thereto. Such longitudinal movement of the nut 102 will vary the position of the flange 103 in relation to the inner surface of the cup-shaped member 52 and thereby provide means for adjusting the second or reset position of the plate 51 and accordingly, through adjustment of the spring 90, the reset pressure setting of the plate 50.

Operably connected to the plate 50 is an arm 150 which extends in rigid fashion exteriorly from the same. A link 151 connects the arm 150 to a control valve 152 slidably mounted in a valve cylinder 152A closed by a suitable plug 152B.

As shown schematically in Figure 1, there is provided in the casing 40 a servo piston 153 slidably positioned in a cylinder 154 having two ports 155 and 156 on opposite sides of said piston, through which ports fluid is caused to flow whenever corresponding spaced covering portions 160 and 161, respectively, of the control valve 152 are not in flow inhibiting relation thereto.

The operating fluid may be oil received from the engine oil supply by way of port 162 formed in a mounting pad 163.

The oil may be returned from cylinder 154 by way of port 164 or 165 leading into the interior of the casing 40 from the valve cylinder 152A, as the case may be, whenever a shifting of the control valve 152 from its neutral position causes one of said ports 164 or 165 to receive oil discharged from the cylinder 154. A port 166 formed in the mounting pad 163 carries the discharged oil from the interior of the casing 40 to a return conduit 167 leading to the engine oil sump.

As best shown in Figure 1, the cylinder 154 is closed by a suitable sealing plug 170 through which slidably projects a piston rod 171 which is operably connected at its free end by a link 172 to the operating lever 17 of the valve 16 for controlling the air inlet to the supercharger 12.

In the adjustment of the regulator 18 for operation, the stem 112 is first adjusted so as to position the stem 93 and plate 51 in relation to the spring 90 in such a manner that a shifting of the plate 51 to a second or reset position will be effected by the supplemental fluid carried by conduit 31 at a pressure indicative of operation of the supplemental fluid injection system.

Second, the spring 80 may then be adjusted through operation of the stem 82 so that the bellows 45 and 46 forming a carburetor air inlet boost control may cause the plate 50 to assume a neutral position in relation to the control valve 152, when the carburetor air inlet pressure acting within the bellows 45 is at the predetermined low pressure value and the plate 51 is at the position normally assumed when the supplemental fluid injection system is not in operation.

Finally, the sleeve 114 may then be adjusted so as to position the flange 103 of the nut 102 so as to limit the adjustment of the plate 51 during the operation of the supplemental fluid injection system to a position which will effect a predetermined high pressure setting for the induction system. Thus, in the latter reset position, through the resulting adjustment of the spring 90, the bellows 45 and 46 forming a pressure boost control will cause the plate 50 to assume a neutral position in relation to the control valve 152 when the carburetor air inlet pressure acting within the bellows 45 is at the predetermined increased pressure value desired during operation of the supplemental fluid injection system.

In the operation of the regulator 18, it will be seen that, during normal operation, an increase in the pressure at the air inlet to the carburetor above the predetermined value will cause the bellows 45 to shift the plate 50 to the left, shifting the control valve 151 to the position shown in Figure 1 and actuating the servo piston to the right, tending to close the valve 16 to the supercharger inlet and thereby decreasing the pressure in the carburetor air inlet 10 until the valve 151 is returned to a neutral position. A decrease in the carburetor inlet pressure below the predetermined value will effect an opposite adjustment of the valve 16 and increase the pressure at the carburetor air inlet. Thus, while the altitude of the aircraft or other operating conditions of the aircraft may vary effecting the induction pressure, the regulator 18 will tend to readjust the valve 16 so as to maintain such pressure at a substantially constant value.

Upon initiating the operation of the supplemental fluid injection system by opening the valve 26, a fluid medium will be supplied the conduit 23 under pressure of the pump 25, whereupon the fluid pressure supplied the regulator 18 through the conduit 31 will be increased, effecting an expansion of the bellows 47 and the shifting of the plate 51 from the position shown in Figures 1 and 2 to a second position to the right, as determined by the adjustment of the flange 103, and thereby changing the datum or setting of the boost control, bellows 45 and 46. Thus, such an adjustment of the plate 51 will cause a corresponding adjustment through the spring 90 of the plate 50 and valve 151, causing the piston 153 to be adjusted to left and opening the valve 16 until the pressure within the carburetor air inlet conduit 10 has been increased to such a value as to bias the plate 50 to the left so as to return the valve 151 to a neutral position. The bellows 45 and 46 will then tend to maintain the pressure at the latter reset value. The said increased boost pressure will permit greater engine power to be obtained during operation of the supplemental fluid injection system than would be otherwise possible.

However, upon the operation of the supplemental fluid injection system being discontinued, the pressure supplied the bellows 47 through the conduit 31 will be decreased, whereupon the spring 90 will return the plate 51 to the position shown in Figures 1 and 2 and the pressure setting or datum of the boost control 45 and 46 will once again resume the normal value for the first position.

Although only one embodiment of the invention has been illustrated and described, various changes in the form and relative arrangement of the parts, which will now appear to those skilled in the art, may be made without departing from the scope of the invention. Reference is, therefore, to be had to the appended claims for a definition of the limits of the invention.

What is claimed is:

1. A regulator for the induction system of a supercharged aircraft engine comprising, in combination, a first bellows responsive to a first induction pressure condition of the engine, a second bellows responsive to a second operation condition of the engine, spring biasing means interposed between said first and second bellows for biasing said bellows in opposite directions, control means operated by said first bellows in response to said first condition, and said second bellows adjusting the biasing force of said spring means from a first to a second predetermined value in response to said second condition so as to vary the datum of said second first bellows and the setting of said control means.

2. In a regulator for the induction system of a supercharged aircraft engine of the type including a carburetor for supplying a combustible mixture to said engine, and operable means for injecting a supplemental fluid for suppressing predetonation of said engine; and said regulator including a boost control means for regulating said induction system so as to maintain the pressure thereof at a predetermined constant value; the improvement comprising means responsive to operation of said fluid injecting means for operating said boost control means so as to change said predetermined constant value from a first to a second selected value, and manually operable means for adjusting said first and second selected values.

3. A regulator comprising in combination, a casing, a first, second and third bellows connected in series within said casing, first conduit means for supplying a first fluid medium to the interior of said first bellows, second conduit means for supplying a second fluid medium to the interior of said third bellows, the second bellows being evacuated and positioned between said first and third bellows, spring means positioned within said second bellows and biasing said second bellows in a direction opposing the biasing force of the fluid medium within said first and third bellows, control means operated by said first bellows, and said third bellows adjusting the biasing force exerted upon said first bellows by said spring means in response to the biasing force of said second fluid medium so as to change the position of the control means operated by said first bellows.

4. A regulator comprising in combination, a casing, a first, second and third bellows connected in series within said casing, first conduit means for supplying a first fluid medium to the interior of said first bellows, second conduit means for supplying a second fluid medium to the interior of said third bellows, the second bellows being evacuated and positioned between said first and third bellows, spring means positioned within said second bellows and biasing said second bellows in a direction opposing the biasing force of the fluid medium within said first and third bellows, said first bellows being arranged so as to operate a control means, said third bellows adjustable from a first to a second position in response to said second fluid medium for changing the biasing force exerted upon said first bellows by said spring means, a first adjustable member mounted in said casing for varying said first position, and a second adjustable member mounted in said casing for varying said second position.

5. A regulator comprising in combination, a casing, a first, second and third bellows connected in series within said casing, first conduit means for supplying a first fluid medium to the interior of said first bellows, second conduit means for supplying a second fluid medium to the interior of said third bellows, the second bellows being evacuated and positioned between said first and third bellows, spring means positioned within said second bellows and biasing said second bellows in a direction opposing the biasing force of the fluid medium within said first and third bellows, said first bellows being arranged so as to operate a control means, said third bellows adjustable from a first to a second position in response to said second fluid medium for changing the biasing force exerted upon said first bellows by said spring means, a first rotatable means mounted in said casing for varying said first position, a second rotatable means mounted on said first rotatable member and coaxial therewith for varying said second position.

6. A regulator comprising in combination, a casing, a first, second and third bellows connected in series within said casing, first conduit means for supplying a first fluid medium to the interior of said first bellows, second conduit means for supplying a second fluid medium to the interior of said third bellows, the second bellows being evacuated and positioned between said first and third bellows, spring means positioned within said second bellows and biasing said second bellows in a direction opposing the biasing force of the fluid means within said first and third bellows, said first bellows being arranged so as to operate a control means, said third bellows adjustable from a first to a second position in response to said second fluid medium for changing the biasing force exerted upon said first bellows by said spring means, a first rotatable member mounted in said casing, a second rotatable member mounted on said first rotatable member coaxial therewith, a pin carried by said second member, an adjustment nut for varying said second position of said third bellows, said adjustment nut interconnected with said second rotatable member through said pin, a stem screw threadedly carried by said first member and held from rotation relative to said second member by said pin, whereby, upon rotation of said first member, longitudinal movement is imparted to said stem for varying said first position of said third bellows.

7. The combination, comprising a supporting means, a first rotatable member carried by said supporting means, a second member rotatable independently of said first member, said second member rotatably mounted on said first rotatable member coaxial therewith, a third rotatable member for varying the limit of movement in one direction of an adjustable element, means interconnecting said third member with said second rotatable member, a fourth member screw threadedly carried by said first rotatable member and held from rotation relative to said second member by said interconnecting means, whereby, upon rotation of said first rotatable member longitudinal movement is imparted to said fourth member for varying the limit of movement of said adjustable element in another direction.

8. For use with the induction system of a supercharged aircraft engine having a carburetor for supplying a combustible mixture to said engine, and operable means for injecting a supplemental fluid for suppressing predetonation of said engine; a boost control for regulating said induction system so as to maintain the pressure thereof at a predetermined constant value, means responsive to operation of said fluid injection means for operating said boost control so as to change said predetermined constant value from a first to a second selected value, a first adjustable member to vary said first selected value, and a second adjustable member to vary said second selected value so that said first and second selected values may be independently adjusted.

HOWARD A. ALEXANDERSON.

REFERENCES CITED

The following references are of record in the file of this patent:

UNITED STATES PATENTS

| Number | Name | Date |
|---|---|---|
| 2,031,527 | Dodson | Feb. 18, 1936 |
| 2,059,042 | Schweller | Oct. 27, 1936 |
| 2,170,974 | Parkins | Aug. 29, 1939 |
| 2,216,699 | Berger | Oct. 1, 1940 |
| 2,217,364 | Halford et al. | Oct. 8, 1940 |
| 2,233,307 | Dodson | Feb. 25, 1941 |
| 2,233,319 | Lozivit et al. | Feb. 25, 1941 |
| 2,243,627 | Gregg | May 27, 1941 |
| 2,248,780 | Pierce | July 8, 1941 |
| 2,305,070 | Butler et al. | Dec. 15, 1942 |
| 2,392,565 | Anderson | Jan. 8, 1946 |

FOREIGN PATENTS

| Number | Country | Date |
|---|---|---|
| 419,920 | Great Britain | Nov. 21, 1934 |
| 113,026 | Australia | May 2, 1941 |
| 537,026 | Great Britain | June 5, 1941 |